United States Patent [19]

Lamar

[11] 4,132,375

[45] Jan. 2, 1979

[54] VORTEX-LIFT ROLL-CONTROL DEVICE

[75] Inventor: John E. Lamar, Newport News, Va.

[73] Assignee: The United States of America as represented by the Administrator of the National Aeronautics and Space Administration, Washington, D.C.

[21] Appl. No.: 779,429

[22] Filed: Mar. 21, 1977

Related U.S. Application Data

[63] Continuation of Ser. No. 651,002, Jan. 21, 1976, abandoned.

[51] Int. Cl.² ............................ B64C 3/38; B64C 5/08
[52] U.S. Cl. .................................. 244/90 R; 244/218; 244/46
[58] Field of Search ................... 244/218, 46, 49, 199, 244/90 R

[56] References Cited

U.S. PATENT DOCUMENTS

| | | | |
|---|---|---|---|
| 1,982,242 | 11/1934 | Bellanca | 244/218 |
| 2,222,997 | 11/1940 | Ballanca et al. | 244/218 |
| 3,273,828 | 9/1966 | James | 244/218 |
| 3,493,197 | 2/1970 | Spearman | 244/218 |
| 3,497,163 | 2/1970 | Wakefield | 244/218 |
| 3,599,904 | 8/1971 | Condit | 244/49 |

*Primary Examiner*—Galen L. Barefoot
*Attorney, Agent, or Firm*—Howard J. Osborn; John R. Manning; Wallace J. Nelson

[57] ABSTRACT

A wing, for aircraft of cropped, arrow-type planform with thin leading and side edges, having a pivotable tip to alter the crop angle of the wing during flight. Increasing the crop angle causes the wing side edge to become a trailing edge which reduces the strength of the side edge vortex flow. Decreasing the crop angle causes opposite results, in particular the side edge is now a leading edge and can generate a leading edge vortex flow. The wing constitutes a roll control device for aircraft of the stated design particularly effective at higher angles of attack.

6 Claims, 2 Drawing Figures

VORTEX-LIFT ROLL-CONTROL DEVICE

ORIGIN OF THE INVENTION

The invention described herein was made by an employee of the United States Government and may be manufactured and used by or for the Government for governmental purposes without the payment of any royalties thereon or therefor.

This is a continuation, of application Ser. No. 651,002 filed Jan. 21, 1976, now abandoned.

BACKGROUND OF THE INVENTION

1. Field of the Invention

This invention relates to a roll control device having particular application to aircraft possessing a cropped, arrow-type planform with thin leading and side edges, control being achieved by altering the wing surface area which a shed vortex system provides lift against.

The problem of roll control is evident with all aircraft, with solutions being varied and numerous. Generally, tip- and trailing- edge ailerons, partial span flaps, horizontal tails or spoilers are used to provide rolling moments for maneuverability and control in aircraft having transonic and supersonic capability. There are, however, disadvantages to these solutions. Specifically rolling moment effectiveness falls off as the angle of attack is increased. The devices are also susceptible to reversal where deflection of the control surface induces elastic distortions so as to create an aerodynamic moment of the opposite sense to the control surface deflection and of such magnitude that no resultant control moment is produced. Furthermore, the devices produce an unfavorable yawing moment when deployed. The tip aileron poses a separate problem since it is an added-on aerodynamic surface which, under the expected local flow conditions, would produce increases in the local loadings. Hence, a structural problem could result.

It is therefore an object of the present invention to disclose a roll control device having increased rolling-moment effectiveness at the higher angles of attack.

A further object of the invention is to provide a device producing increased roll-rates over a wide angle of attack range.

An additional object of the invention is to provide a roll control device not as susceptible to reversal as prior devices.

Another object of the invention is to provide a roll control device which produces no or favorable yawing moments in flight.

A further additional object of the invention is to provide a device which utilizes leading- and side-edge shed vortex systems to impart rolling moments to an aircraft for maneuverability and control.

2. SUMMARY OF THE INVENTION

Vortex flows, such as those associated with edge separation, and their accompanying flow re-attachment, are encountered at many points within the flight and maneuver envelopes of high-speed aircraft. While performing wind tunnel tests to determine if a mathematical analogy correlated with empirical data, it was discovered that vortex flow around the side edges of an aircraft having a cropped arrow planform produced lift. Hence, it was hypothesized that if there was a method of weakening the vortex flow on one wing panel, a significant amount of rolling moment could be produced, especially at the higher angles of attack where ailerons are generally ineffective. It was discovered that alteration of the crop angle, that is, a change in position of the wing tip side edge from parallel with the longitudinal plane of symmetry of the aircraft to another position, of one or both wing panels to create an asymmetrical aircraft planform produced such a rolling moment. In the present invention a powered aircraft having a conventional fuselage, is provided with a segmented wing projecting from each side of the fuselage. Each wing includes a main wing panel having a swept leading edge and an outboard tip control panel pivotally connected to the main wing panel near the outboard edge thereof for rotation in the wing areal plane. The tip control panel possesses a substantially straight tip edge which, when positioned parallel with the longitudinal plane of symmetry of the aircraft, is subject to the vortex flow present there and hence contributes to wing lift.

By varying the position of a tip edge so that it no longer parallels the longitudinal plane of symmetry but rather extends rearwardly and inwardly, the wing surface area behind the leading edge tip subject to vortex flow is reduced resulting in a similar reduction in wing lift. By positioning the other tip control panel in asymmetrical relation to the first, a rolling moment will be imparted to the aircraft in the direction of the wing possessing the smaller lift component.

Since vortex lift increases with angle of attack, rolling moment effectiveness does not fall off as the angle of attack is increased. Furthermore, yawing moment is absent or favorable. Additionally, the devise is not as susceptible to reversal since roll control is accomplished without deflection of a surface into the air stream.

A more complete appreciation of the invention and many of the attendant advantages thereof will be readily apparent as the same becomes better understood by reference to the following detailed description when considered in connection with the accompanying drawings wherein:

FIG. 1 is a plan view of the segmented wing aircraft of the present invention with the wings thereof disposed such that tip vortex lift is a component of total wing lift on both wings; and FIG. 2 is a plan view of the segmented wing aircraft of the present invention with the right wing thereof disposed such that tip vortex lift on the left panel is effectively removed while on the right panel additional vortex lift in the tip control area is generated thus imparting a rolling moment to the aircraft.

DETAILED DESCRIPTION

Figure 1:
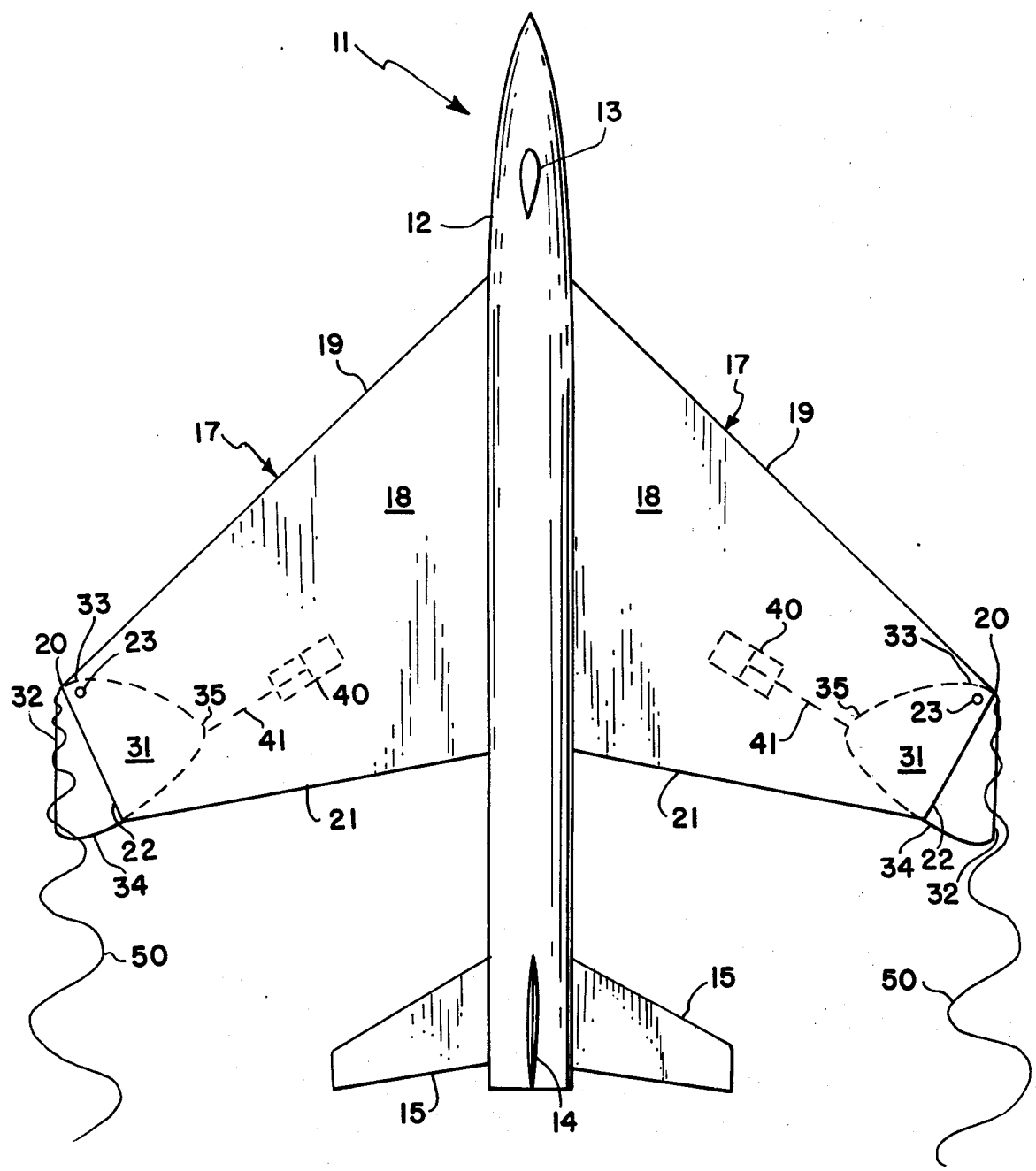

Referring now the drawings wherein like reference numerals designate identical parts throughout the several views, and more particularly to FIG. 1, there is shown an aircraft of variable crop angle generally designated by the reference numeral 11. Aircraft 11 is provided with a conventional fuselage 12 having a length to equivalent diameter or fineness ratio, suitable for transonic and/or supersonic flight. A suitable control compartment or pilots cabin, is also included in fuselage 12 adjacent the forward end thereof, in a conventional manner. A conventional empennage assembly including a vertical stabilizer member 14 projecting upwardly from the upper surface of fuselage 12 and swept horizontal stabilizer members 15 projecting outwardly from the aft end of fuselage 12 are also provided. The airfoil sections of these stabilizer members 14 and 15 are preferably taken from the supersonic family of symmetrical thin airfoils.

Aircraft 11 is provided with a wing projecting outwardly from each side of fuselage 12 and generally designated by the reference numeral 17. Each wing 17 includes a main wing panel 18 having a then straight leading edge 19 and a straight trailing edge 21 which converge outwardly toward a tip section 22, angles inwardly. Each wing 17 also includes an outboard tip control panel 31. Each tip control panel includes a substantially straight thin side edge 32 and a root section having an arcuate forward portion 33 which flares into a substantially straight after portion leading to an angular intersection with the curved trailing edge 34.

The root of tip control panel 31 extends into main wing panel 18 through a suitable slot formed in the tip section 22 thereof, not illustrated, and occupies a suitable recess within the main wing panel 18. Tip control panel 31 is suitably connected to main wing panel 18 for rotation in the wing areal, or planform, plane about a pivot point 23 located within main wing panel 18 near the forward portion of tip section 22 thereof and which is located in the forward portion of tip control panel 31.

Pivot panel, or connection 23, for tip control panel 31 may be suitable steel pin and bearing arrangement or the like and extends perpendicular to the plane of main wing panel 18 for rigid connection with tip control panel 31. Conventional actuators 40 and linkage 41 are provided to afford selective relative pivotal movement of the outboard tip control panels 31 and would be controlled by the pilot of the aircraft as conventionally with the other controls. The linkages 41 are fixed to the aft end of the root sections 35 of tip control panels 31. The linkages are also connected to actuators 40 occupying a suitable recess within the main wing panel 18. The actuators 40 may be pneumatic, hydraulic or some other mechanism capable of imparting a translational movement to the linkages 41.

OPERATION

Figure 2:
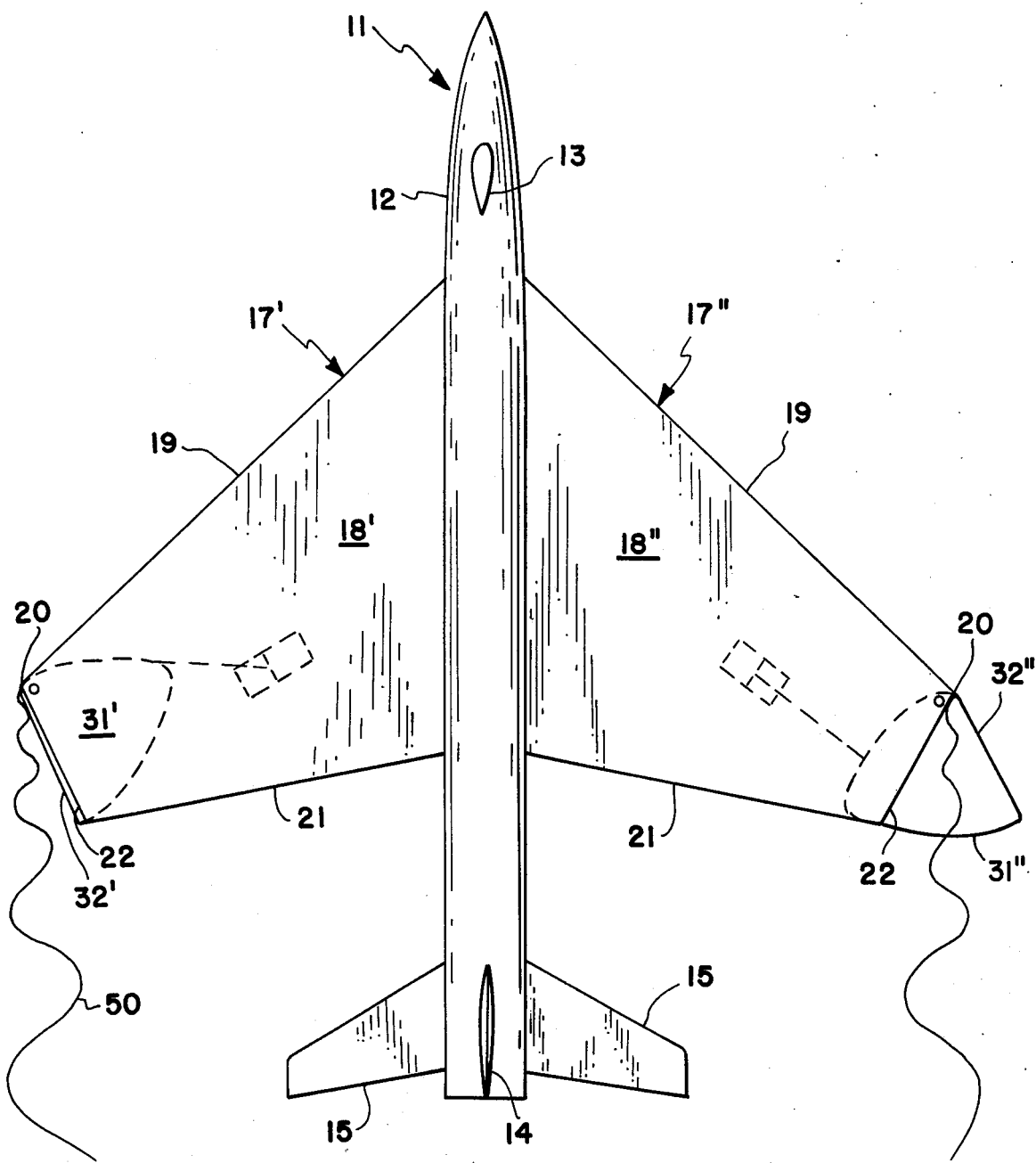

Thus, during takeoff, climb and cruise, a swept cropped planform such as shown in FIG. 1 is desirable, as discussed hereinbefore. By positioning tip control panels 31 with side edges 32 parallel with the longitudinal plane of symmetry of the aircraft vortex flows 50 acting along the wing side edges 32 produce a component of wing lift. However, during certain aircraft maneuvers such as a bank or roll, it is necessary to unbalance the lift components on the wings to impart a rolling moment to the aircraft. Turning now to FIG. 2, it may be seen that the present invention provides a variable crop angle aircraft which possesses such capabilities. During the maneuvers hereinbefore referred to, outboard tip control panels 31 may be pivoted through the instrumentality of the means aforementioned to the positions shown in FIG. 2, wherein left tip control panel 31' is pivoted into main wing section 18' while right tip control panel 31" is pivoted out from main wing section 18".

In sweeping left control panel 31' into the main wing section 18', side edge 32' is removed from the vortex flow which thereby reduces the lift on the left wing 17' by an amount approaching 31' vortex lift component. If right wing 17" and its tip control panel 31" remained in the position shown in FIG. 1, a rolling moment would be imparted to aircraft 11 since lift attributable to the vortex 50, present along the tips, would remain a component of total wing lift on right wing 17" while the lift on left wing 17' would be diminished by the amount previously attributable from vortex 50.

Should a larger rolling moment be desired, tip control panel 31" may be swept out into the position shown in FIG. 2, to provide a slight increase in wing surface area exposed to the vortex flow 50 present in that region. Such asymmetrical tip position would further unbalance the lift components between the wings thereby increasing the aircraft roll rate.

It is to be understood that aircraft 11 may be provided with any conventional propulsion engines, pitch and yaw control surfaces landing gear and the like equipment normally found in such aircraft without departing from the scope of this invention. Such equipment is not shown, since it forms no part of the present invention.

Obviously, many modifications and variations of the present invention are possible in the light of the above teachings. It is therefore understood that within the scope of the appended claims the invention may be practiced otherwise than as specifically described.

What is claimed as new and desired to be secured by Letters Patent of the United States is:

1. A roll control for an aircraft having a swept cropped planform capable of subsonic, transonic and supersonic flight comprising:
   a fuselage;
   a wing having a highly swept cropped planform connected to each side of said fuselage;
   each said wing including a main wing panel having a leading edge, a trailing edge and a tip section extending from the tip of the leading edge inwardly and rearwardly with respect to the longitudinal plane of symmetry of said aircraft;
   each said wing further including a tip control panel pivotably connected to said tip section and having a tip edge which defines the outboard edge of said wing;
   means for independently moving each said tip control panel from a first position where said tip edge is substantially parallel to said longitudinal plane of symmetry to a retracted position extending inwardly and rearwardly toward said plane whereby said tip edge thereof controls the intensity of the leading edge and side edge vortex lift generated by the shed vortex system resulting from separated flow and subsequent flow reattachment in the region of said tip edge.

2. The roll control of claim 1 wherein each said tip control panel is pivotable in a substantially horizontal plane.

3. The roll control of claim 2 wherein each said tip edge is substantially straight and is subject along its entire length to said edge vortex lift when positioned parallel to the longitudinal plane of symmetry of said aircraft.

4. In the roll control of claim 1, wherein each said tip control panel is moveable such that said tip edge extends rearwardly and outwardly with respect to the longitudinal plane of symmetry of said aircraft thus increasing the intensity of side edge vortex lift acting along said leading edge and tip edge and the area of said wing thereby increasing lift on said wing.

5. The roll control of claim 4 wherein said independent means can move said tip edges such that one said tip edge extends rearwardly and outwardly.

6. A roll control as in claim 1 wherein:
   each of said main wing panel is fixed to said fuselage;
   each of said pivotable outboard tip control panels including a leading edge, and a trailing edge and is connected to each of said inboard wing panels in substantially coplanar relation therewith for rotation within predetermined limits in a substantially horizontal plane about a pivot point;

each of said pivot points being located on a chord line of an outboard tip control panel near the leading edge thereof;

each of said pivot points further being located with respect to the inboard main wing panel closely proximate the tip section of said inboard wing panel whereby said tip control panels are independently movable such that said tip edges thereof control the intensity of side vortex lift generated by the shed vortex system resulting from separated flow and subsequent flow reattachment in the region of said tip edge.

* * * * *